United States Patent [19]

Shiba et al.

[11] Patent Number: 4,558,387
[45] Date of Patent: Dec. 10, 1985

[54] MAGNETIC TAPE CASSETTE

[75] Inventors: Haruo Shiba; Michio Iizuka, both of Tokyo, Japan

[73] Assignee: TDK Corporation, Tokyo, Japan

[21] Appl. No.: 619,987

[22] Filed: Jun. 12, 1984

[30] Foreign Application Priority Data

Jul. 11, 1983 [JP] Japan ............................ 58-106532[U]

[51] Int. Cl.$^4$ ........................ G11B 23/02; G11B 23/04
[52] U.S. Cl. .................................... 360/132; 242/199
[58] Field of Search ................... 360/132, 134, 93, 94, 360/96, 85, 92; 242/197, 198, 199, 200

[56] References Cited

U.S. PATENT DOCUMENTS

| 4,097,006 | 6/1978 | Saito | 242/199 |
| 4,191,984 | 3/1980 | Tsukidate | 242/199 |
| 4,232,350 | 11/1980 | Ohta | 360/132 |
| 4,466,585 | 8/1984 | Maehara | 360/132 |

FOREIGN PATENT DOCUMENTS

| AZ0045082 | 2/1982 | European Pat. Off. . |
| AZ0071996 | 2/1983 | European Pat. Off. . |
| A10094087 | 11/1983 | European Pat. Off. . |
| A2007188 | 5/1979 | United Kingdom . |
| A2024775 | 1/1980 | United Kingdom . |
| A2055756 | 3/1981 | United Kingdom . |
| A2055755 | 3/1981 | United Kingdom . |
| A2114540 | 8/1983 | United Kingdom . |

*Primary Examiner*—Robert M. Kilgore
*Attorney, Agent, or Firm*—Oblon, Fisher, Spivak, McClelland & Maier

[57] ABSTRACT

A magnetic tape cassette comprises at least one reference hole formed in either of upper and lower casings so as not to prevent the running of a magnetic tape, at least one reference boss formed in the other one of the casings in alignment with the reference hole to be closely fitted thereto, and guide supporting members for holding guide members positioned at a given distance from the reference hole and the reference boss.

4 Claims, 3 Drawing Figures

MAGNETIC TAPE CASSETTE

The present invention relates to a magnetic tape cassette. More particularly, it relates to a magnetic tape cassette having improved guide members for a magnetic tape.

Magnetic tape cassettes such as video tape cassettes are provided with a plurality of guide members such as pins, posts and so on to adequately guide a magnetic tape.

FIG. 1 shows a typical video tape cassette in which upper and lower casings 2 and 1 are adapted to be assembled together and the lower casing 1 is provided with guide members 4, 6 and front guiding surfaces 5, 5 at the front part of the casing 1 so that a magnetic tape wound on a hub (not shown), loosely fitted to an opening 3 of the lower casing 1 is caused to pass guide member 4, the front guiding surfaces 5, 5 and the guide member 6 to a hub (not shown) loosely fitted to an opening 4' of the lower casing 1 to be wound on the hub.

Since the guide members 4, 6 provided at both ends at the of the magnetic tape cassette are usually in contact with the magnetic tape running at the time of recording or reproducing, the quality of the guide members is closely related to easiness of the running of the magnetic tape or the damage of the tape. It is desirable for the surface of the guide members to have a uniform, smooth surface so that the magnetic tape runs smoothly and wearing of the tape caused by frictional contact with the magnetic tape is small. If these conditions are not satisfied, the magnetic tape may be scratched or shaved to thereby cause increase in dropping-out phenomenon. Therefore, a metallic tube having a smooth surface or a piece in a sleeve form have been used as guide members. In addition, the guide member should have perpendicularity which determines the position of the magnetic tape during running of the tape. If the perpendicularity is not maintained, the magnetic tape tends to move unstably upward or downward during the running. In the most extreme case, the magnetic tape moves beyond the length of the guide members and the edge of the magnetic tape may be damaged.

The guide members are generally firmly fitted to guide pins formed integrally with either of the upper and lower cases. For example, the guide members are secured in such a manner that tubular guide members are fitted to the guide pins which are formed integrally with the lower case and which have a length smaller than that of the guide members and the upper case having bossess formed in alignment with the guide pins is assembled to the lower case with the top of the bossess being fitted to the upper part of the guide members. As another way, guide pins having the same length as the guide members are formed in the lower casing and tubular guide members are fitted to the guide pins, thereafter the upper casing with bossess is put on the lower casing with the bossess being fitted into holes formed in the top of the guide pins. Thus, the guide members are fixed by clamping with the upper and lower casings. In either way, it is difficult to maintain the perpendicularity of the guide members due to incomplete assembling or error in dimension of the upper and lower casings.

It is an object of the present invention to provide a magnetic tape cassette assuring perpendicularity of guide members for a magnetic tape to minimize irregular assemblage of upper and lower casings.

The foregoing and the other objects of the present invention have been attained by providing a magnetic tape cassette comprising upper and lower casings and guide members provided in the lower casing to guide the running of a magnetic tape, characterized by comprising at least one reference hole formed in either of the upper and lower casings and positioned so as not to obstruct the path of the magnetic tape, at least one reference boss formed in the other one of the casings in alignment with the reference hole to be closely fitted thereto, and guide supporting members for holding the guide members positioned at a given distance from the reference hole and the reference boss.

In a preferred aspect of the present invention, an upright guide pin is formed in either of the upper and lower casings and a second guide pin is formed in the other one so as to be in alignment with the first guide pin when the upper and lower casings are assembled together and a guide member is fitted around the guide pins. As another expedient, a fixed boss is formed in either of the upper and lower casings to be fitted to the top end of a guide pin formed in the other one casings.

A more complete appreciation of the invention and many of the attendant advantages thereof will be readily obtained as the same becomes better understood by reference to the following detailed description when considered in connection with the accompanying drawings, wherein.

Figure 1:
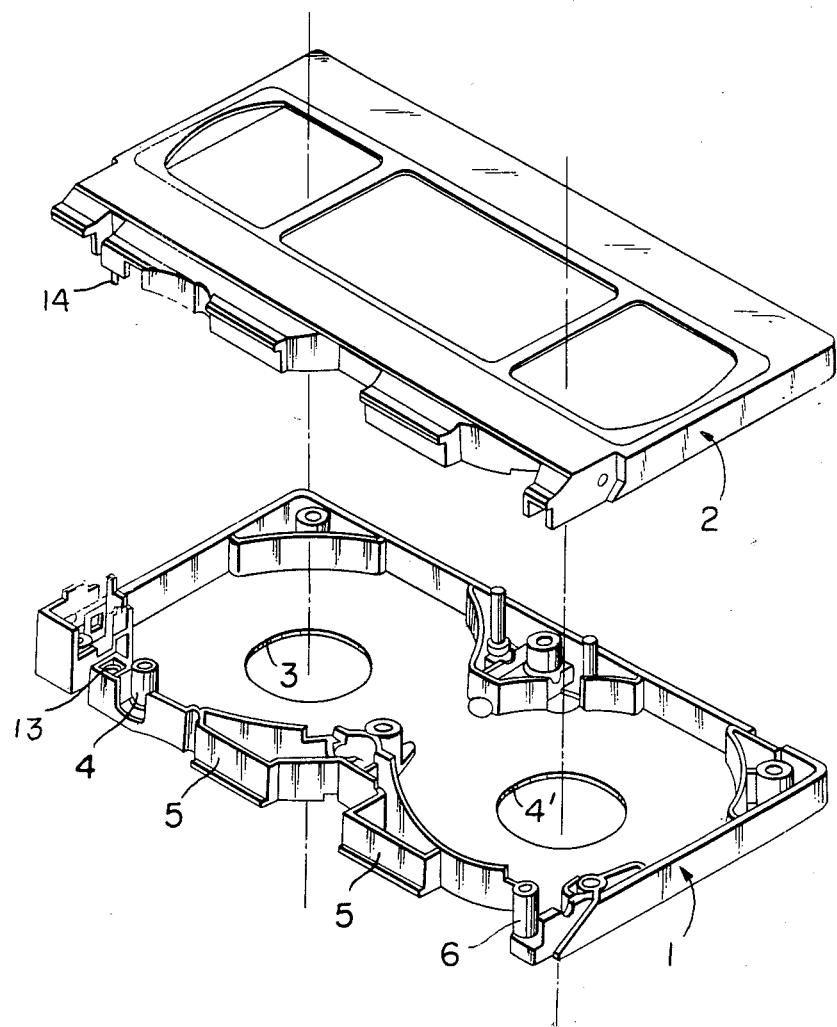
FIG. 1 is an exploded perspective view of an embodiment of the upper and lower casings according to the present invention.
Figure 2:
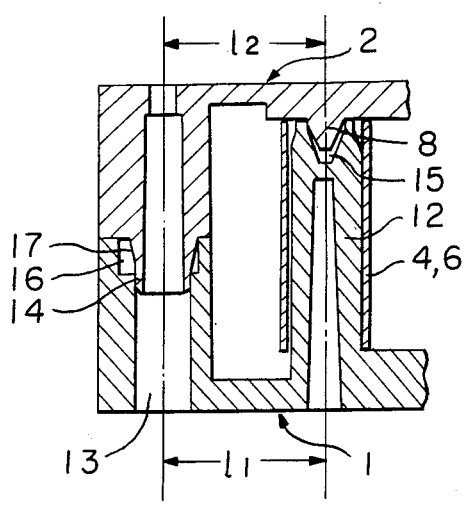
FIG. 2 is an enlarged cross-sectional view of the first embodiment of the present invention.

In the following, preferred embodiments of the present invention will be described with reference to drawings. FIG. 2 is a cross sectional view taken along the vertical plane including the axial line of the guide members 4, 6 shown in FIG. 1. An upright guide pin 12 is formed integrally with the lower casing 1. On the other hand, a boss 8 is formed integrally with the upper casing 2 so as to be in alignment with and to be fitted to a recess 15 formed in the top end of the guide pin when the upper and lower casings are assembled whereby perpendicularity of the guide pin is maintained. Around the guide pin 12, a tubular metallic guide member 4 or 6 having a smooth surface is fitted. There are respectively formed at least one reference hole and reference boss at desired positions, preferably near the guide pin 12 but not obstructive to the running of the magnetic tape. Namely, in the embodiment shown in FIG. 1, a reference hole 13 having a vertical axial line is formed in a side wall of the lower casing 1 and an enlarged diameter portion 16 is formed at the top of the reference hole 13 to facilitate the assembling of the casings. On the other hand, a reference boss 14 is formed in the upper casing 2. The reference boss 14 has the axial line in alignment with that of the reference hole 13 and its tapered base portion 17 to facilitate the assembling by insertion of the tapered portion into the reference hole 13. The axial line of the guide pin 12 formed in the lower casing 1 is determined to have a given distance l from the axial line of the reference hole 13 and the axial line of the boss 8 formed in the upper casing 2 is also determined to have a given distance l from the axial line of the reference boss 14.

The top portion extending from the tapered portion 17 of the reference boss 14 is formed into a cylindrical shape having an outer diameter which is closely fitted to the inner diameter portion of the reference hole. The enlarged diameter portion formed in the reference hole 13 may be of a tapered form which is sufficient to receive the tapered portion of the reference boss although a stepped portion is formed in the enlarged diameter portion in the embodiment shown in FIG. 2.

In the embodiment described above, when the upper and lower casings are to be assembled, the recess 15 of the guide pin 12 is precisely in alignment with the boss 8 by close fitness of the reference hole 13 and the reference boss 14 whereby the perpendicularity of the guide pin 12, hence the perpendicularity of the guide member 4 or 6 can be always maintained.

Figure 3:
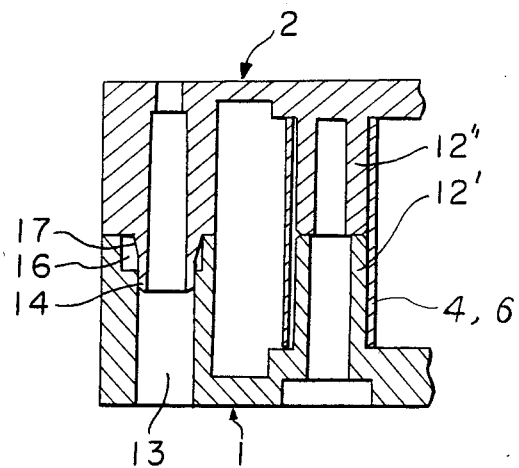
FIG. 3 is an enlarged cross-sectional view of the second embodiment of the present invention.

FIG. 3 is an enlarged cross sectional view showing another embodiment of the present invention. The structure of the embodiment is principally the same as the embodiment shown in FIG. 2 provided that the way of supporting the guide member 4 or 6 is different from the foregoing embodiment. As shown in FIG. 3, the guide member 4 or 6 is supported by both an upright guide pin 12' formed in the lower casing 1 which has a given distance from the reference hole 13 and an upright guide pin 12' formed in the upper casing 2 which has the same distance from the reference boss 14 so as to be in alignment with the upright guide pin 12' whereby the perpendicularity of the guide pin 4 or 6 can be maintained.

As described above, the perpendicularity of the guide members of the magnetic tape cassette can be maintained by the fittness of the reference hole and the reference boss and irregularity of the upper and lower casings is prevented at the time of assemblage whereby the guide members undergo constant, uniform contact with the magnetic tape and the recording and reproducing characteristic of the magnetic tape is maintained at a high level.

We claim:
1. A magnetic tape casette comprising:
upper and lower casings;
guide members for guiding the running of a magnetic tape;
at least one reference hole formed in either of said upper and lower casings and positioned so as not to obstruct the path of said magnetic tape;
at lest one reference boss formed in the other one of said casings in alignment with said reference hole to be closely fitted therein, and;
at least one pair of guide supporting members for holding one of said guide members positioned at a given distance from said reference hole and said reference boss, said at least one pair of guide supporting members further comprising a guide pin fixed to said lower casing and a guide pin boss fixed to said upper casing, said guide pin being disposed within one of said guide members and having a recess means disposed in an upper portion thereof for receiving said guide pin boss, wherein said closely fitting reference hole and reference boss comprise means for precisely aligning said guide pin boss in said recess means of said guide pin to maintain perpendicularity of said guide member.

2. The magnetic tape cassette according to claim 1, wherein said reference hole has a vertical axis and is formed in a side wall of a casing near said at least one pair of guide supporting members.

3. The magnetic tape cassette according to claim 1, wherein an enlarged diameter portion is formed in the top of said reference hole and said reference boss is provided with a tapered base portion.

4. The magnetic tape cassette according to claim 3, wherein said reference boss is provided at its free end with a cylindrical portion which is closely fitted to said reference hole.

* * * * *